United States Patent [19]

Warren

[11] 4,125,914
[45] Nov. 21, 1978

[54] EGG WASHING MACHINE

[76] Inventor: William H. Warren, 729 S. Main St., Centerville, Mass. 02632

[21] Appl. No.: 800,324

[22] Filed: May 25, 1977

[51] Int. Cl.$^2$ ............................................. A01K 43/00
[52] U.S. Cl. ..................................................... 15/3.13
[58] Field of Search ................... 15/3.13, 3.14, 3.15, 15/3.16, 3.17, 77, 102

[56] References Cited

U.S. PATENT DOCUMENTS

| | | | |
|---|---|---|---|
| 3,035,539 | 5/1962 | Jennings | 15/77 X |
| 3,296,641 | 1/1967 | Rose et al. | 15/3.13 |
| 3,349,419 | 10/1967 | Kuhl et al. | 15/3.13 |
| 3,999,238 | 12/1976 | Hanson | 15/77 X |

Primary Examiner—Edward L. Roberts

Attorney, Agent, or Firm—Holland, Armstrong, Wilkie & Previto

[57] ABSTRACT

An improved egg washing machine is disclosed using an advancing conveyor for moving rows of eggs under an egg washing spray and scrubbing brushes. The spray uses a staggered array of nozzles having a generally square spray pattern and the brushes are angularly aligned with respect to the rows of eggs so that each brush engages less than the full number of eggs in each row of eggs at any one time. When used with an intermittently advancing conveyor, the brushes are movably mounted for being advanced over the eggs while the eggs are stationary between conveyor advances and for returning over the eggs in the opposite direction against the direction of conveyor movement during the conveyor advance.

13 Claims, 8 Drawing Figures

EGG WASHING MACHINE

BACKGROUND OF THE INVENTION

The present invention relates to automatic egg washing and more particularly to an improved automatic egg washing machine for washing eggs including soiled eggs smoothly and effectively and at high speeds.

Egg washing machines are already known, such as that illustrated in U.S. Pat. No. 3,621,503 to Classen dated Nov. 23, 1971, where eggs are moved through a washer on roller-type or similar conveyors. The machine of the present invention is an improvement upon these prior mechines as it provides a better wash, particularly for badly soiled eggs, and as it performs the wash with a smooth washing action requiring less power and which is adapted for direct coupling to a related machine such as an egg breaking or other machine. The reduced power requirement and the more effective brush and washing nozzle arrangement permit such a direct drive and therefore also provide for an effective and simple synchronizing action between the washer speed and the particular operating speed of the coupled egg breaker or other egg processing machine.

The improved egg washing machine, in accordance with the present invention, employs diagonally oriented brushes mounted on a simplified brush height adjusting means beneath a spray wash arrangement of square pattern washing nozzles.

Accordingly, an object of the present invention is to provide an improved automatic egg washing machine.

Another object of the invention is to provide a brush operated egg washing machine having reduced brush drive power requirements.

Another object of the invention is to provide an improved egg washer brush driving and mounting arrangement which is precisely and easily adjusted and which passes egg mid-lines at the extreme end of each stroke for brush reversal on intermittently moving conveyors.

Another object of the invention is to provide an improved wash nozzle lay-out in an automatic egg washing machine incorporating square washing patterns.

Another object of the invention is to provide an improved automatic egg washer incorporating a simplified brush drive arrangement adapted for being coupled to another egg processing machine.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 7 is a horizontal sectional view taken along line 7—7 on FIG. 5.

DESCRIPTION OF THE PREFERRED EMBODIMENT

Figure 1:
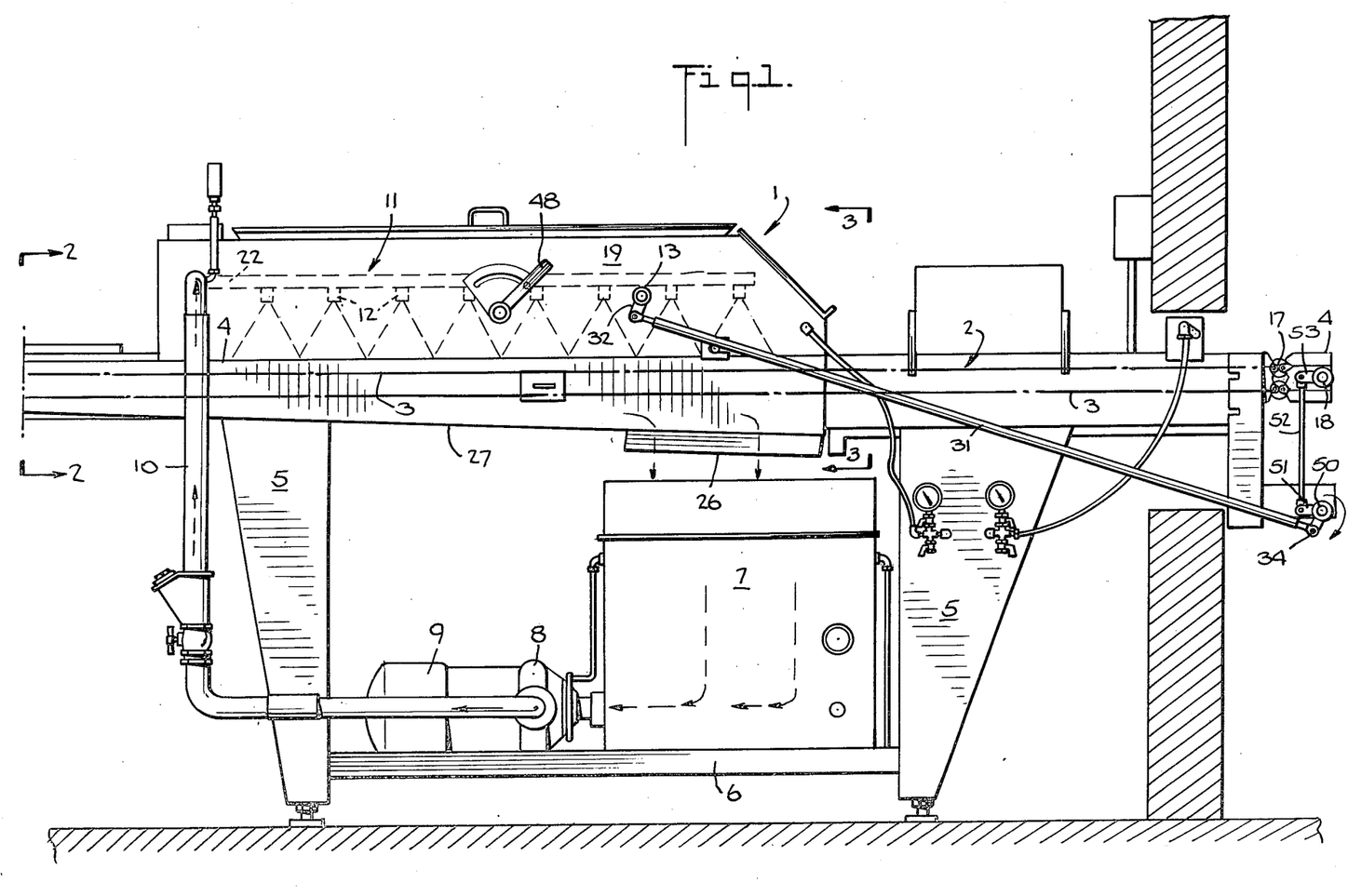
FIG. 1 is a side elevational view of an egg washing machine in accordance with the present invention.

FIG. 1 is a side elevational view of a preferred embodiment of the washer 1. The washer 1 includes a rollertype egg conveyor 2 whose path is illustrated generally at 3. The conveyor support or side rails 4 are mounted on suitable spaced legs 5. A shelf 6 mounted on the legs 5 supports a wash water tank 7 and the nozzle water supply pump 8 and drive motor 9. The pump 8 feeds the wash water to a supply line 10 which is coupled at its upper end to an array 11 of egg washing nozzles 12. The nozzles 12 are mounted on elongated manifolds 13 extending longitudinally of the egg conveyor and which position the individual nozzles 12 above egg washing brushes 14 as illustrated in FIGS. 3 and 4.

Figure 2:
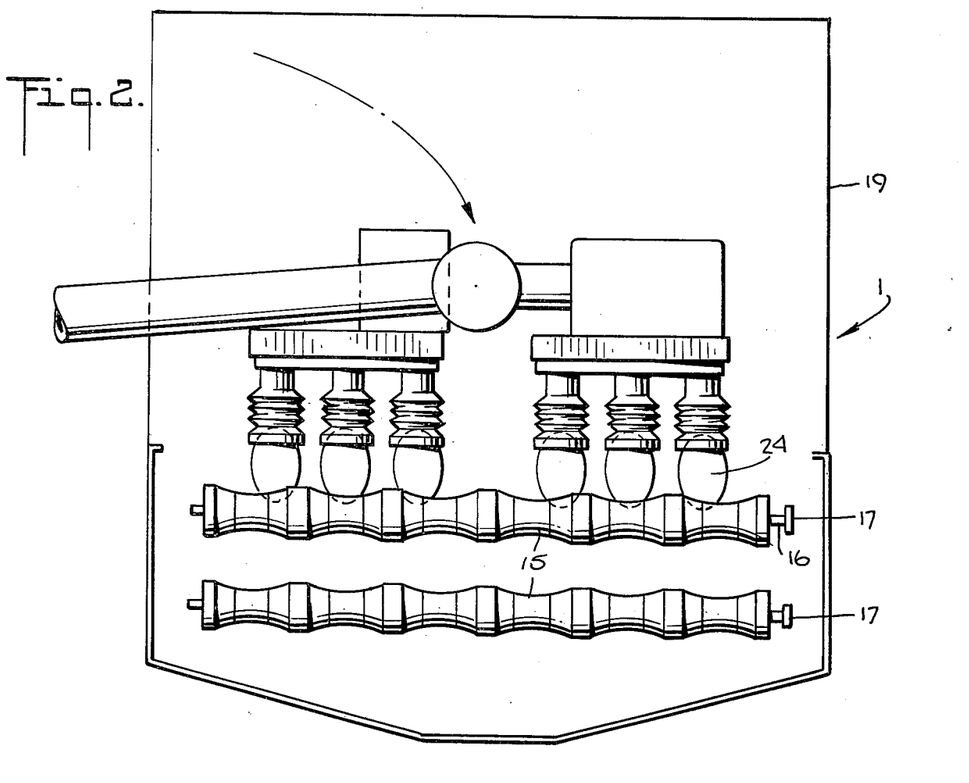
FIG. 2 is a vertical sectional view taken along line 2—2 on FIG. 1.

The egg conveyor 2 is preferably of the known rollertype. Such conveyors comprise pocketed rollers 15 (FIG. 2) mounted on support shafts 16 extending between spaced drive chains 17 mounted on suitable end sprockets 18. The conveyor 2 extends through the washer 1 which includes a hollow open ended cover 19.

Two principal elements of the washing means comprise the nozzle array 11 and the brush assembly 20 which comprises a plurality of the egg brushes 14 extending across the conveyor 2 at an angle to the longitudinally oriented conveyor rollers 15.

Figure 3:
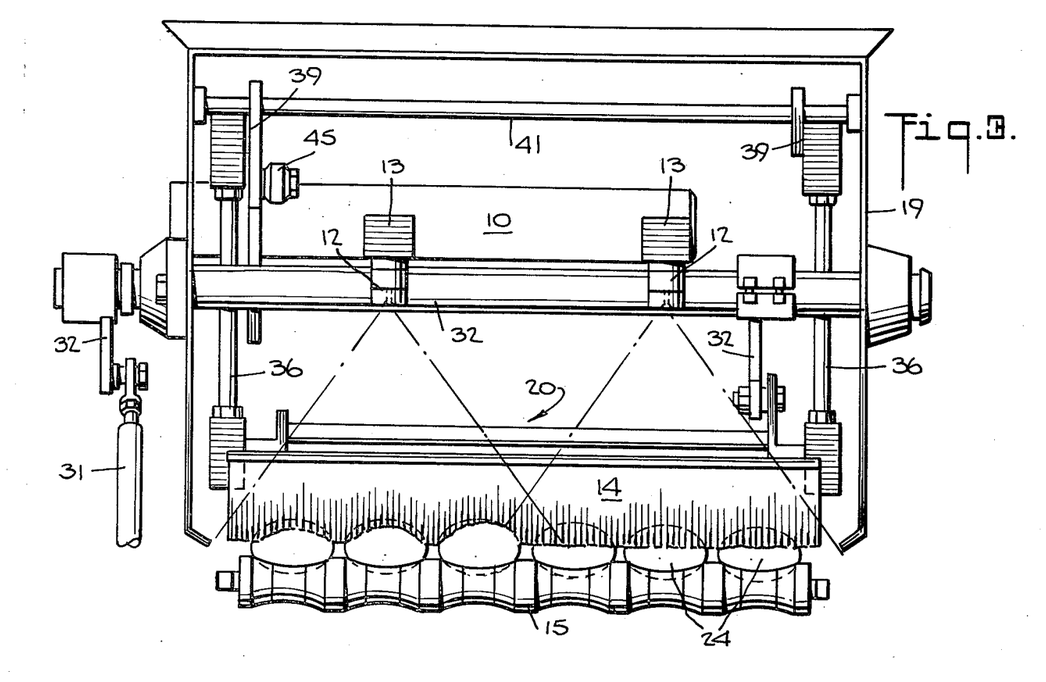
FIG. 3 is a vertical sectional view taken along line 3—3 on FIG. 1.
Figure 4:
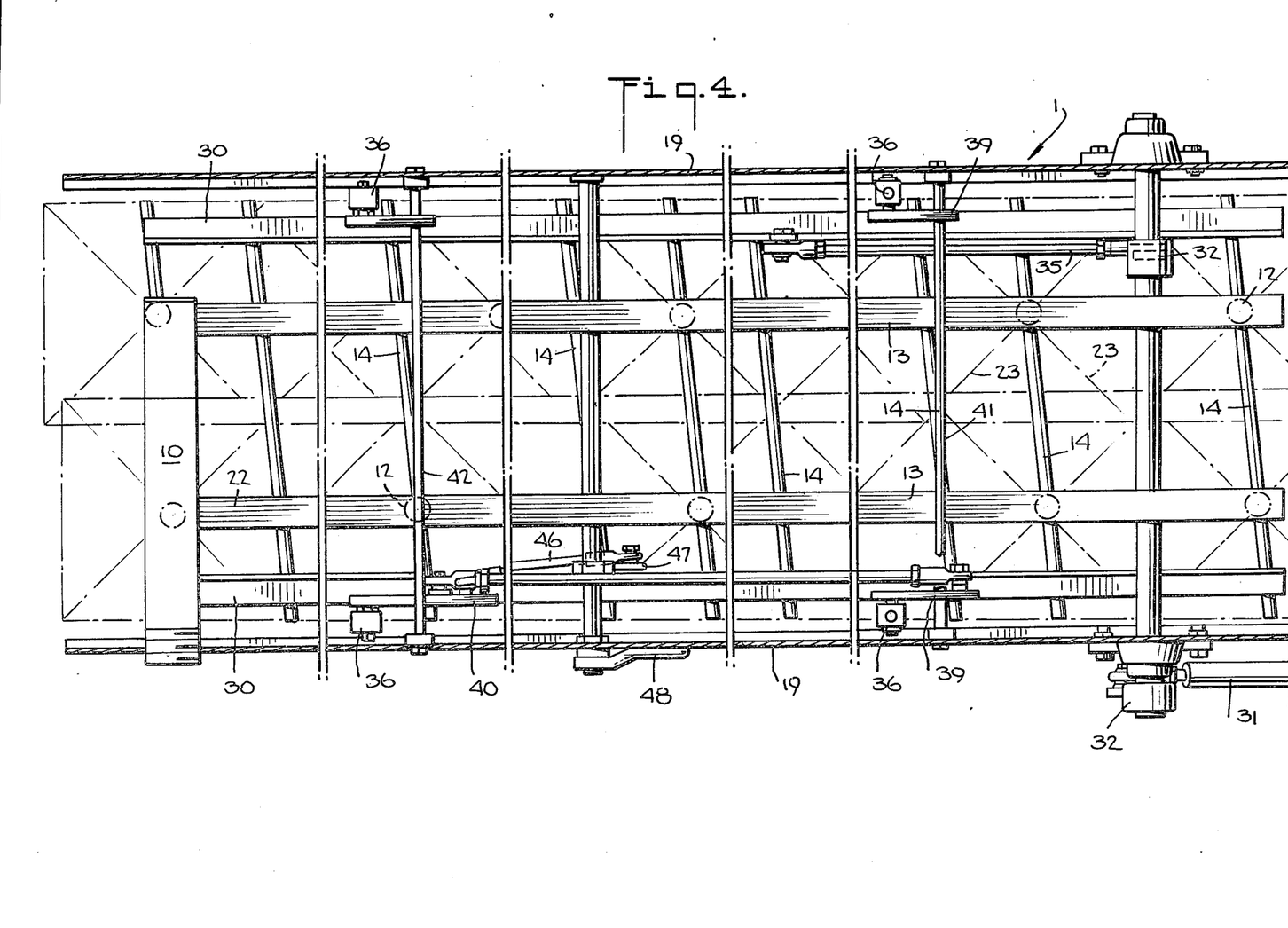
FIG. 4 is a top plan view partially cut away illustrating the nozzle and brush mounting arrangement.
Figure 5:
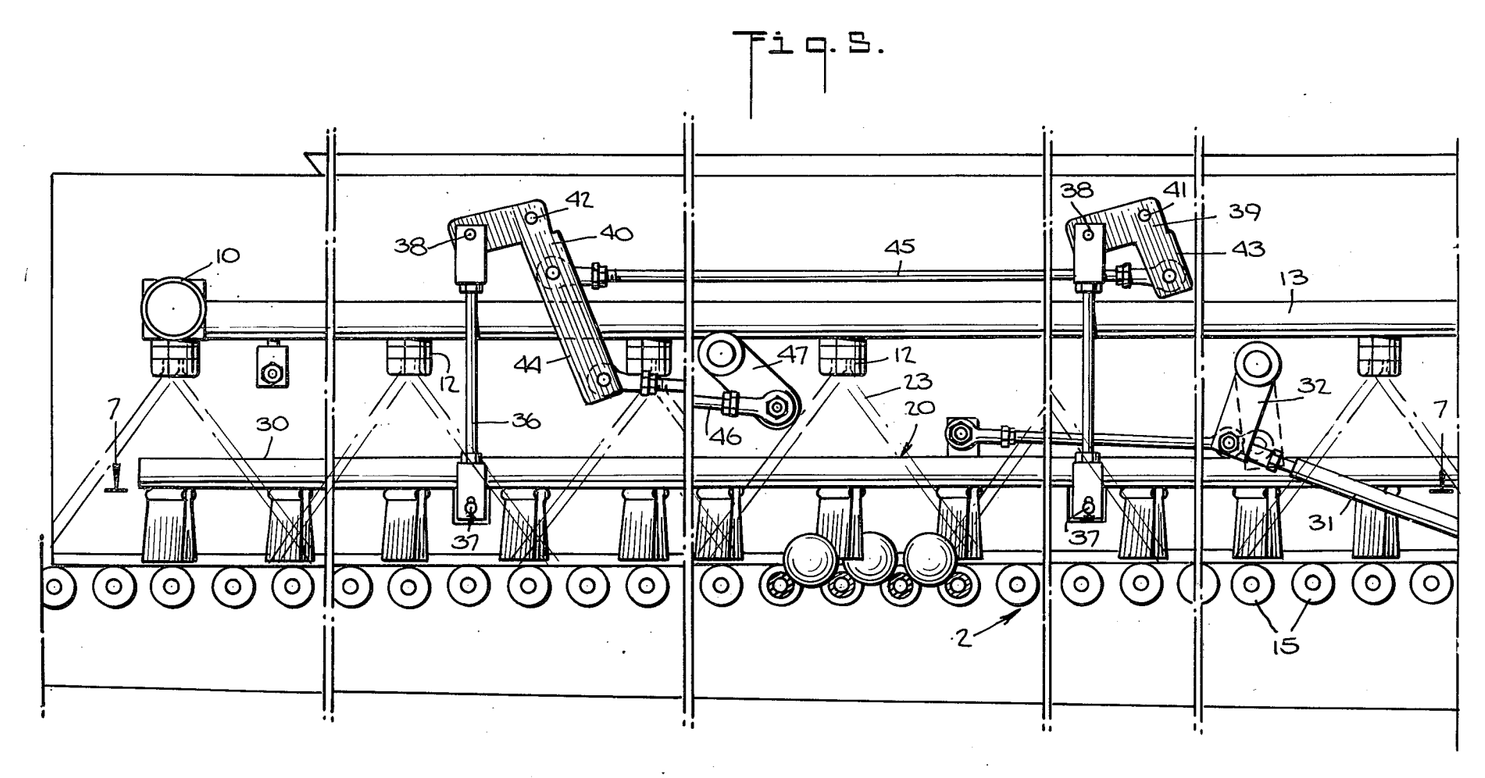
FIGS. 5 and 6 are enlarged detailed side elevational views of the nozzle and brush mounting arrangements, showing the brush height adjusting means.
Figure 6:
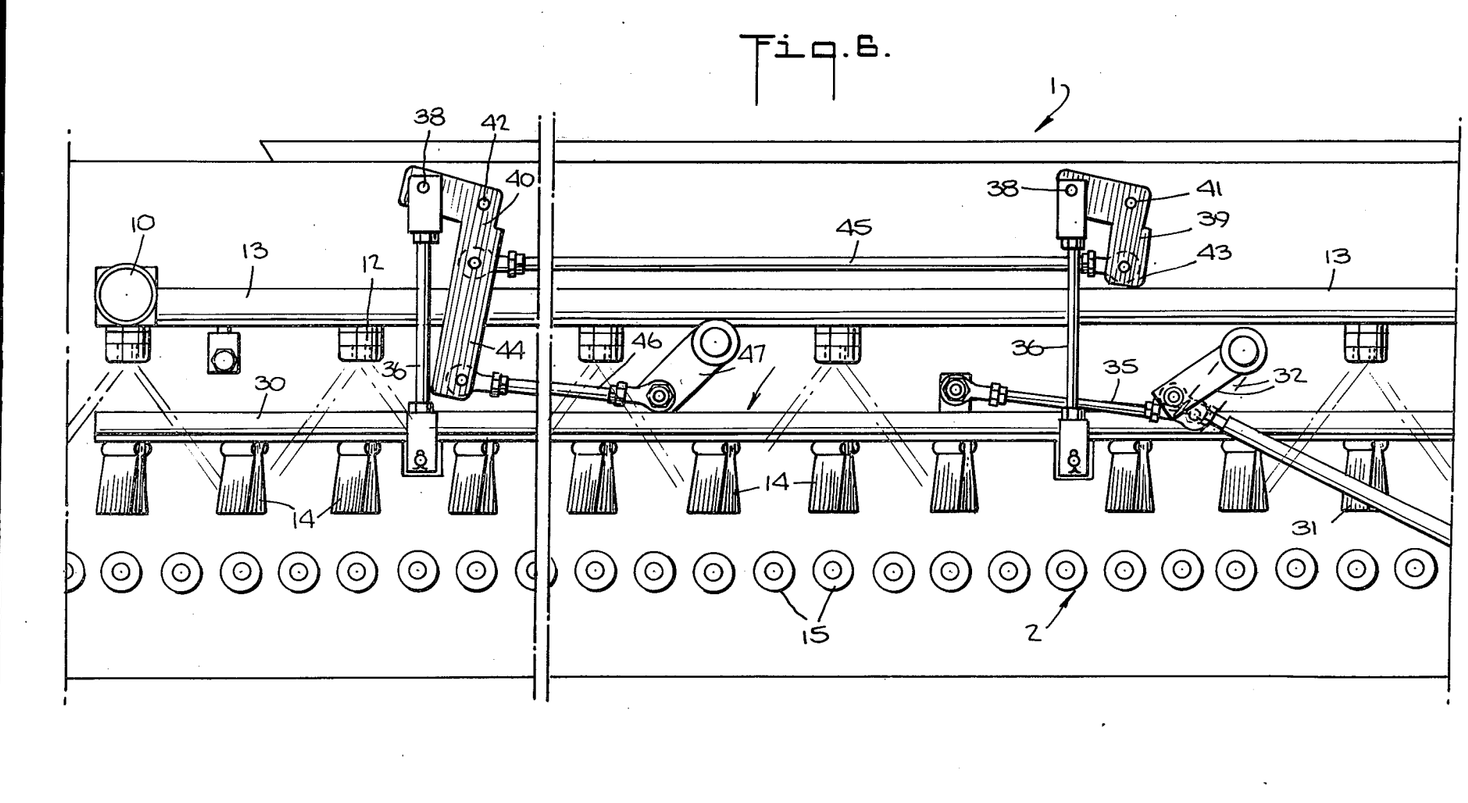

The preferred nozzle array 11 is illustrated in FIGS. 1, 3, 4 and 5. It comprises the longitudinally oriented water distribution manifolds 13 which have their forward ends 22 coupled to the vertical water supply line 10 from the pump 8. As best illustrated in FIGS. 3 and 4, the manifolds 13 are spaced laterally of the conveyor 2 for supporting the plurality of spray nozzles 12. The preferred spray nozzle pattern is a square to produce the square and overlapping spray patterns 23 as illustrated in FIGS. 3, 4, 7 and 8. Spray nozzles are known which produce the generally square spray pattern as illustrated in FIGS. 3 and 4. This arrangement of the wash water manifolds 13 and square spray nozzles 12 provides for an efficient and full coverage of eggs 24 being carried through the washing zone on the conveyor 2.

As will be more fully described below, the cooperating driven egg washing brushes 14 are arranged generally laterally of the conveyor with an angular alignment of approximately 4° with the axis of the conveyor rollers 15 each of which are mounted at right angles to the conveyor path and the conveyor chains 17. For efficient and complete spray coverage of the eggs 24 beneath the brushes 14, the center lines of adjacent nozzles 12 mounted on the manifolds 13 are aligned with the brushes 14 so that a line through the center of two adjacent nozzles 12 also extends across the conveyor 2 path at an angle of approximately 4° to the laterally aligned conveyor rollers 15.

The wash water for the nozzles 12 is supplied from the supply tank 7 mounted in the bottom of the washer 1 through the intermediation of the motor driven pump 8, the connected wash water supply line 10, and the manifolds 13. After being directed over the eggs 24 and through the open conveyor 2, the wash water drains back to the holding tank 7, through a suitable aperture 26 provided in the otherwise imperforate bottom 27 of the conveyor support portion of the washer 1.

THE IMPROVED BRUSH MOUNTING & DRIVE

Figure 8:
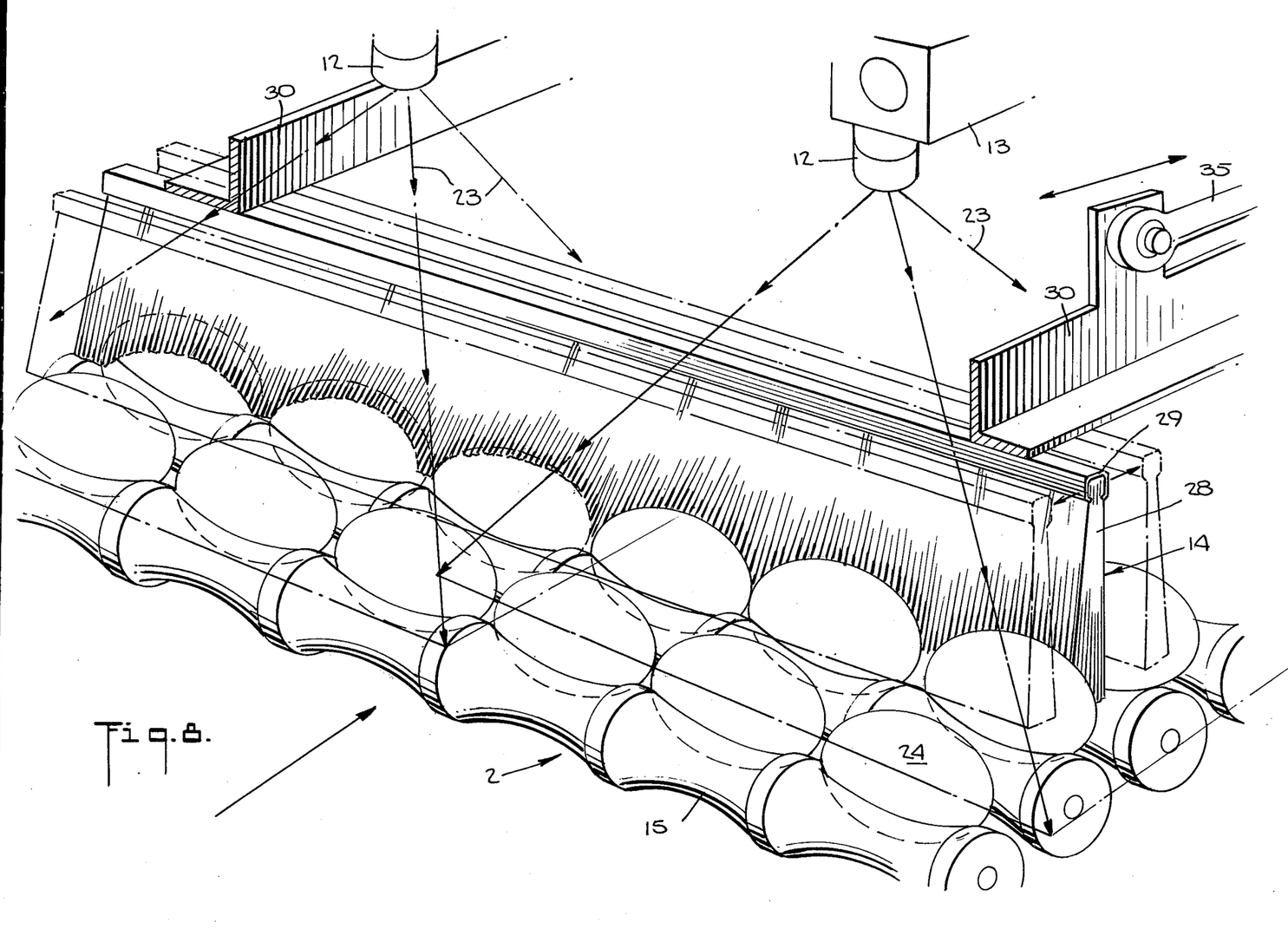
FIG. 8 is a detailed perspective view illustrating the brush and nozzle positions.

The egg brushes 14, which perform the egg washing operation in combination with the above described wash water spray, comprise a plurality of the brushes 14 mounted to extend generally laterally across the egg conveyor 2. As illustrated in FIGS. 3 through 8, each individual brush 14 comprises generally vertically oriented bristles 28 mounted on bristle supports 29. In order to provide simultaneous longitudinal motion of all of the brushes 14, each brush 14 is attached at its opposite ends to a pair of longitudinal brush drive rods 30. The attachment of the brushes 14 to the drive rods 30 is done with the above mentioned 4° angle from the lateral conveyor roller 15 axes, as best seen in FIGS. 4 and 8.

A particular advantage resulting from this angular alignment of the individual brushes 14 results from the fact that the angular alignment causes each brush to be in engagement with only some of the eggs 24 in each row of eggs at any given time including the beginning movement of the brush strokes in both directions. This partial engagement of each brush 14 with the egg rows at all times significantly reduced the power required for the longitudinally, oscillating motion of the brushes 14 back and forth over the rows of eggs 24 during a washing cycle.

As illustrated in FIGS. 7 and 8, for example, each of the brushes 14 will be in full engagement with only two or three eggs 24 and may only lightly engage another egg 24. As added eggs 24, in each row, engage the brushes 14 during the motion of the brushes 14, other eggs 24 will clear other portions of the brushes 14. All eggs 24 in each row receive a full brushing action, however, the amount of power required for driving the brushes 14 is significantly reduced in this manner.

The brush assembly 20 is continuously driven forward in the direction of movement of the roller conveyor 2 and then back in the opposite direction. For washing eggs, the preferred length of this movement is approximately four inches to insure a full brushing of the eggs 24 in each row of eggs.

A preferred drive means for the brush assembly 20 is a coupling using a drive rod 31 (FIG. 1) which connects drive crank 32 on the washer 1 with a rotating drive crank 34 on the related egg processing machine, such as an egg breaker. Drive crank 32 is coupled to the brush assembly 20 by a drive link 35. By using this interconnection for the brush assembly drive, the speed of brush movement is kept proportional to the speed of the related breaking machine at all times. Higher brushing speeds are automatically obtained to correspond with increased operating speeds of the egg breaker or the other interconnected apparatus.

A preferred mounting for the brush assembly 20 permits the brush height with respect to the egg conveyor to be adjusted for differing conditions and egg sizes. The height adjustment is provided for the brush assembly with the mounting illustrated in FIGS. 4, 5 and 6. This mounting includes vertical connecting rods 36 pivotally attached to the brush assembly 20 at 37 and having their upper ends pivotally connected at 38 to L-shaped mounting brackets 39 and 40. The brackets 39 and 40 are pivotally attached to the washer housing 19 on shafts 41 and 42. Legs 43 and 44 of the L-shaped brackets are adjustably rotated about the shaft 41 and 42 to determine the brush 14 height through the intermediation of a connecting rod 45 and by an adjusting rod 46 coupled between one of the support brackets 40 and an adjustable crank 47. A handle 48 (FIG. 1) coupled to the crank 47 is turned for controlling the height adjustment and a suitable locking means is provided on the handle 48.

In order to provide for the synchronization of the conveyor 2 movement and the brush 14 movement, the conveyor 2 and the brush assembly 20 are preferably driven by the same drive. As illustrated in FIG. 1, this is done by driving the conveyor 2 from the same rotating drive shaft 50 used to drive the brush assembly 20 drive rod 31. A crank 51 driven by the drive shaft 50 is coupled by a drive rod 52 to a ratchet 53 attached to the end sprockets on the conveyor 2. The oscillating motion of the crank 51 is converted by the ratchet 53 to an intermittent sprocket movement which periodically advances the conveyor 2 a sufficient distance to dump one row of eggs from the conveyor 2 onto the egg breaking machine or other egg processing machine.

A preferred brush movement, for use with such an intermittent conveyor advance, causes the brush assembly 20 to move in the opposite direction to the conveyor 2 across the eggs 24 as the rows of eggs 24 are advanced and to then return the brush assembly 20 in the directin of conveyor movement while the rows of eggs 24 are stationary during the dwell period between ratchet 53 advances. This relationship is obtained by adjusting the positions of the several drive cranks and drive rods described above.

It will be seen that an egg washer has been provided with an improved brush mounting which gives maximum brush action for a minimum brush drive force. Additionally, the brush action is synchronized with the conveyor movement to permit the maintenance of a preferred timing of the brush strokes conveyor motion. The speed of movement of the brushes is also kept proportional to the related speed of the egg processing machine being fed with the washed eggs. An efficient and cooperating spray system is provided making efficient use of overlapping and staggered arrangements of square pattern spray nozzles and flooding all eggs in the compartment continuously.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In an egg washing machine having a conveyor positioned for moving laterally arranged rows of eggs on the conveyor below egg scrubbing brushes being mounted in rows with the brushes extending laterally across the conveyor at an angle to the rows of eggs whereby each brush engages less than the full number of eggs in each row of eggs at any one time, said brush mounting comprising a movable mounting permitting the brushes to move successively with and against the movement of the conveyor, and drive means coupled to said mounting for moving the brushes in the direction of conveyor advance while said conveyor is stationary and for moving the brushes in the opposite direction while said conveyor is advancing the rows of eggs.

2. The egg washing machine as claimed in claim 1 in which said drive means for said conveyor and for said brush mounting are coupled together and to an egg processing machine being fed eggs by said conveyor.

3. The egg washing machine as claimed in claim 1 in which said brush mounting means includes means for simultaneously adjusting the height of all brushes with respect to said conveyor.

4. The egg washing machine as claimed in claim 1 having a washer housing and in which the mounting for said brushes comprises common support members for the plurality of brushes, generally vertically oriented support arms having their tops and bottoms pivoted to the washer housing and to the support members, respectively, and means for simultaneously adjusting the height of said top pivotal connections.

5. The egg washing machine as claimed in claim 4 in which said pivotal connections for simultaneously adjusting said connection heights comprise additional pivotally mounted members with means coupling said additional pivotally mounted members together for simultaneous movement.

6. The egg washing machine as claimed in claim 1 which further comprises a plurality of spray nozzles having square spray patterns, means for mounting the nozzles in a staggered array with overlapping spray patterns on rows of eggs on said conveyor.

7. In an egg washing machine having a conveyor mounted for intermittently moving laterally aligned rows of eggs through an enclosed washing chamber and having spray means mounted in the chamber for spraying the rows of eggs and brush means for simultaneously scrubbing the sprayed eggs the improvement comprising:

said spray means comprising nozzles having generally rectangular spray patterns;

means for mounting said nozzles in longitudinal rows with said mountings being staggered by being laterally offset and with the square spray patterns overlapping one another;

said brush means comprising a plurality of elongated brushes;

means for mounting each of the brushes laterally across the conveyor at an angle to the laterally aligned rows of eggs;

said brush mounting means including means for permitting said brushes to move with and against conveyor motion; and drive means coupled to said mounting means for moving said brushes with and against the direction of conveyor travel across the rows of eggs with said angular brush alignment causing each brush to engage less than the full number of eggs in each row at any one time.

8. An egg washing machine according to claim 7 in which said drive means is coupled to an egg processing machine at the exit end of the conveyor.

9. An egg washing machine according to claim 7 in which said brushes are moved a longitudinal distance exceeding the width of the eggs.

10. An egg washing machine according to claim 7 in which said mounting means for said brushes includes means for simultaneously adjusting the height of the eggs contacting surfaces of the brushes.

11. An egg washing machine according to claim 7 in which said nozzle mounting comprises fluid supply manifolds extending longitudinally of the conveyor.

12. An egg washing machine according to claim 7 which includes drive means coupled to the conveyor for advancing the conveyor.

13. An egg washing machine as claimed in claim 12 in which said drive means for moving said brushes moves said brushes in the direction of conveyor advance while said conveyor is stationary between its intermittent advances and for moving said brushes in the opposite direction while the conveyor is advancing.

* * * * *